United States Patent [19]

Conner et al.

[11] 4,152,292

[45] May 1, 1979

[54] METHOD OF INITIATING ESSENTIALLY COMPLETE OXIDATION OF CO TO $CO_2$ IN A SPENT-CATALYST REGENERATION ZONE

[75] Inventors: Algie J. Conner, Downers Grove; David B. Bartholic, Itasca, both of Ill.

[73] Assignee: Universal Oil Products Company, Des Plaines, Ill.

[21] Appl. No.: 527,479

[22] Filed: Nov. 26, 1974

Related U.S. Application Data

[63] Continuation-in-part of Ser. No. 258,013, May 30, 1972, abandoned.

[51] Int. Cl.[2] .................... B01J 29/38; B01J 21/20; C10G 11/04; C10G 11/18

[52] U.S. Cl. .................... 252/417; 208/113; 208/120; 208/164; 252/419

[58] Field of Search .................... 252/417, 419; 208/164; 23/288 B, 288 S

[56] References Cited

U.S. PATENT DOCUMENTS

| | | | |
|---|---|---|---|
| 2,589,124 | 3/1952 | Packie | 208/150 |
| 3,261,777 | 7/1966 | Iscol et al. | 208/113 |
| 3,513,087 | 5/1970 | Smith | 208/164 |
| 3,591,783 | 7/1971 | Zumwalt | 208/164 |
| 3,629,097 | 12/1971 | Smith | 208/164 |
| 3,769,203 | 10/1973 | Lee et al. | 208/164 |
| 3,909,392 | 9/1975 | Horecky, Jr. et al. | 252/417 |

OTHER PUBLICATIONS

South African Patent Journal–Jul., 1973–p. 99 A:72/7924 Horecky Jr. et al. (priority Nov. 30, 1971).

*Primary Examiner*—Patrick Garvin

*Assistant Examiner*—P. E. Konopka

*Attorney, Agent, or Firm*—James R. Hoatson, Jr.; Thomas K. McBride; William H. Page, II

[57] ABSTRACT

A method for initiating essentially complete oxidation of carbon monoxide, resulting from the oxidative removal of coke from spent FCC catalyst, to carbon monoxide in a dense-phase bed of catalyst maintained in a regeneration zone. Coke is oxidized at first oxidizing conditions including a temperature of from about 750° F. to about 1250° F. to produce partially spent regeneration gas and regenerated catalyst having a first carbon content. The essentially complete oxidation of carbon monoxide is initiated by: (a) increasing the coke on regenerated catalyst from the first carbon content to a second carbon content and then (b) passing to the dense bed fresh regeneration gas at a flow rate at least stoichiometrically sufficient to produce regenerated catalyst having a third carbon content, less than the first carbon content, and sufficient to produce spent regeneration gas.

The heat released in the dense bed by the oxidation of the additional coke (analyzed and reported as weight percent carbon) increases the dense bed temperature and permits a faster rate of CO oxidation so that essentially complete conversion of CO to $CO_2$ can take place within the dense bed. The availability of sufficient fresh regeneration gas then spontaneously initiates the essentially complete conversion of CO to $CO_2$. Once initiated, the exothermicity of the oxidation of CO further increases the dense phase temperature to maintain a fast rate of reaction. Thereafter, coke and CO are oxidized at second oxidizing conditions to produce spent regeneration gas and regenerated catalyst having the third carbon content.

7 Claims, No Drawings

METHOD OF INITIATING ESSENTIALLY COMPLETE OXIDATION OF CO TO $CO_2$ IN A SPENT-CATALYST REGENERATION ZONE

CROSS-REFERENCE TO RELATED APPLICATIONS

This application is a continuation-in-part application of our copending application Ser. No. 258,013 filed May 30, 1972, and now abandoned all the teachings of which are incorporated herein by specific reference thereto.

BACKGROUND OF THE INVENTION

1. Field of the Invention

The field of art to which this invention pertains is spent catalyst regeneration. More particularly, the invention relates to a method of initiating essentially complete conversion of CO to $CO_2$ which method is specifically applicable to spent fluidized catalytic cracking catalyst regeneration.

2. Description of the Prior Art

Regeneration techniques in which a fluidized spent catalyst containing coke is regenerated in a regeneration zone generally occupy a large segment of the chemical arts. In particular the regeneration of a fluidized spent catalyst from a fluidized conversion process such as fluidized catalytic cracking or fluidized dehydrogenation has been quite extensively reviewed by persons interested in those particular processes. The patents which have attempted to solve problems associated with regeneration of spent fluidized catalyst have generally dealt with maximum removal of coke on catalyst while at the same time attempting to prevent or totally eliminate afterburning of carbon monoxide to carbon dioxide within any portion of the regeneration zone.

Specifically it is present refining practice to operate conventional (non-CO-burning) regeneration zones to essentially preclude conversion of CO to $CO_2$ anywhere within the regeneration zone and especially to preclude afterburning in the dilute catalyst phase where there is little heat sink to absorb the heat of reaction and where heat damage to cyclones or other separation equipment can therefore result. Afterburning in conventional regeneration zones is prevented quite simply by limiting the amount of fresh regeneration gas passing into the regeneration zone. Without sufficient oxygen present to support the reaction of CO to $CO_2$, afterburning simply cannot occur no matter what the temperatures in the regeneration zone. As well, temperatures in conventional regeneration zones are generally limited to less than about 1250° F. At these temperatures, the rate of reaction of CO oxidation is considerably reduces so that should upsets occur more of an excess of fresh regeneration gas is required for afterburning than would be needed at tempertures higher than about 1250° F. Usual practice, familiar to those skilled in the art of FCC processes, upon starting up a conventional regeneration zone is to manually limit the flow rate of fresh regeneration gas to the regeneration zone to an amount sufficient to produce partially spent regeneration gas but insufficient to sustain afterburning while at the same time limiting regeneration zone temperatures to about 1250° F. This flow rate required is usually equivalent to about 8 to 12 pounds of air per pound of coke. When reasonably steady state control was achieved, it is typical practice to regulate thereafter this flow rate of fresh regeneration gas directly responsive to a small temperature differential between the regeneration gas outlet temperature (or the dilute phase disengaging space temperature) and the dense-bed temperature to maintain automatically this proper flow rate of fresh regeneration gas to essentially preclude afterburning of CO to $CO_2$ anywhere within the regeneration zone. This practice is exemplified by Pohlenz U.S. Pat. Nos. 3,161,583 and 3,206,393. While such practice produces a small amount of $O_2$ in the flue gas, generally in the range of 0.1 to 1 vol. % $O_2$, these prior art processes are operated to preclude essentially complete conversion of CO to $CO_2$.

Until the advent of zeolite-containing catalysts, there was little economic incentive for essentially complete conversion of CO to $CO_2$ within the regeneration zone. The heat of combustion that might have been recovered by the process was simply not needed by the process; there was generally no feed preheat for the hydrocarbon reaction zone and the larger coke yield obtained with the amorphous catalysts was generally quite sufficient to provide heat required for the overall process heat balance. The effective utlization of zeolite-containing catalysts with their lower coke-producing tendencies, however, often required an adjustment to the overall heat balance which was normally provided by the addition of a feed preheater. While thermal energy was being added to the front end of the process, the chemical energy of the flue gas exiting from the regeneration zone was often being vented to the atmosphere or being recovered simultaneously in an external CO boiler. Thus a typical flow diagram would then indicate that energy was being added to and then later removed from the process by two external installations, both of which represent a substantial capital investment.

We have now found that it is possible to safely initiate and maintain essentially complete conversion of CO to $CO_2$ in the regeneration zone. More particularly, we have found that it is possible to initiate and maintain essentially complete conversion of CO to $CO_2$ within a dense bed of fluidized catalyst located within the bottom portion of a regeneration zone. Our invention is concerned specifically with a method of initiating the essentially complete conversion of CO to $CO_2$ within a dense phase bed of catalyst maintained in a regeneration zone. As the final step of the method of our invention, coke and CO are oxidized at oxidizing conditions including a temperature from about 1250° F. to about 1400° F. to produce regenerated catalyst having a particular carbon content and spent regeneration gas.

While it is indeed true that prior art references broadly teach the use of temperatures greater than about 1250° F. in regeneration zones (see for example Bunn U.S. Pat. No. 3,751,359; Iscol et al. U.S. Pat. No. 3,261,777; Pfeiffer et al. U.S. Pat. No. 3,563,911, and Lee et al. U.S. Pat. No. 3,769,203) they are concerned with precluding afterburning in regeneration zones and do not teach or suggest the method of our invention for purposefully initiating essentially complete conversion of CO to $CO_2$ within a regeneration zone. Moreover our method recognizes that essentially complete conversion of CO to $CO_2$ cannot be initiated by temperatures above about 1250° F. alone; indeed, the method of our invention requires as a distinct step the passing of stoichiometrically sufficient fresh regeneration gas to the dense bed to make possible the essentially complete conversion of CO to $CO_2$. Without sufficient $O_2$ present, temperatures higher than about 1250° F. will neither initiate nor sustain afterburning. A temperature of above 1250° F. ensures a sufficiently fast rate of reaction so that conversion of CO to $CO_2$ will be essentially completed within the dense bed of the regeneration zone.

SUMMARY OF THE INVENTION

It is, accordingly, a broad objective of the process of this invention to provide a regeneration process for the oxidation of coke from a spent fluidizable catalyst and for the essentially complete conversion of CO, produced by the oxidation of coke, to $CO_2$ to produce regenerated catalyst and spent regeneration gas. It is a more specific objective of this invention to provide a method for initiating essentially complete oxidation of CO to $CO_2$ in a dense-phase catalyst bed in a regeneration zone.

Another object of our invention is to eliminate the discharge of carbon monoxide from an FCC process into the atmosphere. Still another object is to eliminate the necessity of a CO boiler, normally employed external of a fluid catalytic cracking unit to convert CO to $CO_2$, and to recover at least a portion of the heat of CO conversion within the regeneration zone.

In brief summary then, our invention, in one embodiment, a method for initiating essentially complete oxidation of CO to $CO_2$ in a dense-phase catalyst bed maintained in a regeneration zone which method comprises the following steps: (a) passing to the dense catalyst bed spent catalyst and fresh regeneration gas at a first flow rate sufficient to oxidize coke to produce regenerated catalyst having a first carbon content and partially spent regeneration gas; (b) oxidizing coke at first oxidizing conditions to produce regenerated catalyst having said first carbon content and partially spent regeneration gas containing CO; (c) increasing the coke content of said regenerated catalyst from said first carbon content to a second carbon content about 0.1 to about 0.5 wt. % higher than said first carbon content; (d) maintaining said second carbon content to attain a steady-state dense-bed temperature; (e) passing to the dense-phase bed fresh regeneration gas at a second flow rate at least stoichiometrically sufficient to produce regenerated catalyst having a third carbon content, less than said first carbon content, and sufficient to produce spent regeneration gas; and, (f) oxidizing coke and CO at second oxidizing conditions to produce regenerated catalyst having said third carbon content and spent regeneration gas.

Other objects and embodiments of the present invention encompass details about catalysts, operating features, and operating conditions; all of which are hereinafter disclosed in the following discussion of each of these facets of our invention.

DESCRIPTION OF THE INVENTION

As hereinbefore mentioned, the literature is replete with techniques and processes directed toward the fluidized regeneration of a coke-contaminated spent catalyst, and especially as conducted in a fluid catalytic cracking process. FCC technology was initially developed prior to the institution of "Recommendation 41" (pursuant to Section 12 of Public Law 603), and has since continued to be renovated and innovated. In view of more than thirty-odd years of development, no attempt will be made herein to delineate entirely this area of petroleum refining technology. However, a brief description of a typical present-day FCC process is believed warranted in order that our advance in the art may be more clearly appreciated.

As is well known in the petroleum industry, a conventional fluid catalytic cracking system has integrated therein a hydrocarbon reaction zone, a stripping zone, a spent catalyst withdrawal line, containing what is commonly referred to as the "spent-catalyst slide valve", a spent catalyst regeneration zone, and a regenerated catalyst withdrawal line, containing the "regenerated-catalyst slide valve". Other equipment normally includes a charge stock preheater, a fresh regeneration gas heater, a product fractionator, or "main column", and an external boiler to oxidize carbon monoxide to carbon dioxide, recovering the heat so produced in the form of steam.

The charge stock is heated to a selected temperature and enters the hydrocarbon reaction zone wherein it is admixed with varying quantities of one or more hydrocarbon recycle streams and hot regenerated catalyst withdrawn from the regeneration zone. The mixture passes through the reaction zone, wherein cracking reactions take place to produce a mixture comprising product components and spent catalyst containing coke thereon. Product component vapors are separated from entrained spent-catalyst particles, in a cyclone separator, and pass into the main column for condensation and separation into various product streams, one of which is a heavy cycle stock containing catalyst particles. This is passed into a settler for recovery of a clarified oil from slurry oil with the catalyst-containing slurry oil generally being recycled back to the hydrocarbon reaction zone.

Spent catalyst from the hydrocarbon reaction zone is stripped in the stripping zone of hydrocarbon vapors, generally using steam, nitrogen, or other inert gasses, and passed into the regeneration zone through the spent catalyst slide valve. An oxygen-containing, fresh regeneration gas is introduced into a lower portion of the regeneration zone in which a dense phase bed of fluidized catalyst is maintained and coke is oxidized to produce regenerated catalyst and a flue gas containing several volume percent each of CO and $CO_2$. In an upper dilute-phase catalyst region of the regeneration zone separation of regenerated catalyst particles from flue gas takes place. The separation is effected through the use of centrifugal cyclones which return the catalyst particles to the lower phase, through the cyclone diplegs, and direct the flue gas out of the regeneration zone to the CO boiler. Regenerated catalyst particles are withdrawn from the dense phase, through the regenerated catalyst slide valve, and introduced into the hydrocarbon reaction zone.

The flue gas leaving the regeneration zone contains the combustion products from the burning of coke from the catalyst, and is, therefore, rich in carbon monoxide and carbon dioxide. The current practice is to recover the heat of combustion of carbon monoxide to carbon dioxide by passing the flue gas from the regenerator into a CO boiler for oxidation, which generates high pressure steam or serves to preheat the fresh feed charge stock. In this manner, heat of reaction is recovered external to the fluid catalytic cracking process and CO is essentially eliminated from the gases ultimately discharged to the atmosphere. However, the CO boiler becomes an additional, necessary, and expensive piece of mechanical equipment which must be integrated into the conventional fluid catalytic cracking processes.

In the method of our invention, essentially complete CO conversion to $CO_2$ is initiated and takes place within a dense-phase catalyst bed in the regeneration zone. At least a portion of the heat of combustion of CO is recovered by the regenerated catalyst for use within the FCC process and CO pollution of the atmosphere is essentially eliminated without the need for an external CO boiler.

Until the wide-spread usage of zeolite-containing fluid catalytic cracking catalysts there was little economic incentive for essentially complete conversion of CO to $CO_2$ within the regeneration zone. The larger coke yields produced by the amorphous catalysts were generally quite sufficient when burned in the regeneration zone to provide the heat required for the overall process heat balance without such additional heat input as feed preheat. The effective usage of the zeolite-containing FCC catalysts with their lower coke-producing tendencies, however, often made additional heat input, typically in the form of feed preheat, necessary. Thus in many instances heat was being added to and then later removed from the FCC process by two rather expensive external installations.

It has been general refinery practice to operate conventional regeneration zones to essentially preclude afterburning anywhere within the regeneration zone. The term "afterburning" as used herein and as generally understood by those skilled in the art shall mean the uncontrolled, unintentional, and generally incomplete oxidation of CO to $CO_2$. Generally, afterburning occurs during periods of unsteady state operations or process "upsets". Because of the usual practice, as described below, of limiting the amount of fresh regeneration gas and limiting the regeneration zone temperatures, afterburning when it does take place usually does not convert all of the CO present to $CO_2$.

Afterburning was especially to be avoided in the dilute catalyst phase upper region of the regeneration zone where there was little heat sink available to absorb the heat of reaction. Catalyst density in the dilute phase is generally less than about 1.0 pounds per cubic foot and is therefore not sufficient to provide a suitable heat sink for efficient removal of heat from this area of regenerator. The same problem exists downstream of the cyclone separation devices, located in the dilute phase region, where there is generally no catalyst present in the flue gas.

Afterburning was prevented quite simply by limiting the amount of fresh regeneration gas passed into the regeneration zone; without sufficient oxygen present afterburning could not occur within the regeneration zone no matter what the temperature within the regeneration zone. As well, temperatures in the regeneration zones were generally limited to less than about 1250° F. by the proper selection of hydrocarbon reaction zone operating conditions or feed streams to the hydrocarbon reaction zone or both. At these temperatures, the rate of reaction of CO oxidation was considerably reduced so that should upsets occur more of an excess of fresh regeneration gas would be required for unintentional afterburning that might result than would be required at temperatures higher than about 1250° F.

By way of contrast, our invention basically centers around a method for initiating the intentional, controlled, and essentially complete combustion of CO within a dense-phase bed of catalyst maintained in a regeneration zone. The dense phase within the regeneration zone can contain anywhere from about 5 to about 30 or more pounds of catalyst per cubic foot of volume which is a sufficient amount of catalyst to provide a suitable heat sink to absorb the heat resulting from the essentially complete combustion of CO to $CO_2$. By the method of our invention, essentially complete combustion of CO to $CO_2$ is initiated and maintained in the dense phase catalyst bed thereby avoiding the potentially harmful effects of such conversion to catalyst separation devices located in the dilute phase region of the regeneration zone. Regenerated catalyst produced and which passes to the hydrocarbon reaction zone is at a higher temperature than would be produced with no CO conversion within the dense bed thereby permitting a reduction or elimination of external feed preheat. Essentially complete combustion of CO to $CO_2$ within the regeneration zone also substantially eliminates atmospheric CO pollution without the requirement of an external CO boiler. The method of our invention is applicable to conventional regeneration zones without extensive modifications or revamps to such zones.

Suitable catalysts which can be used in CO-burning regeneration zones include any of the catalysts known to the art of fluid catalytic cracking or suitable for use in such a process. Specifically included are the so-called amorphous FCC catalysts comprising silica and/or alumina and the zeolite-containing catalysts. The more preferred catalysts, however, will be the zeolite-containing catalysts because of their better stability to the higher temperatures encountered in CO-burning regeneration zones. Catalysts employed may optionally contain catalytically effective amounts of CO oxidation promotors to permit CO conversion to take place at a reduced temperature.

The term "spent catalyst" as used in this specification means catalyst withdrawn from a hydrocarbon reaction vessel because of reduced activity caused by coke deposits. Spent catalyst passing into the first dense bed can contain anywhere from a few tenths up to about 5 wt. % of carbon but typically in FCC operations spent catalyst removed from the hydrocarbon reaction zone will contain from about 0.5 to about 1.5 wt. % carbon.

The term "regenerated catalyst" as used in this specification shall mean catalyst from which at least a portion of coke has been removed. Regenerated catalyst will generally have a carbon content of from about 0.01 to about 0.5 wt. % depending primarily upon the regeneration zone operating conditions employed but also upon the design and construction of the regeneration zone. Regenerated catalyst produced from CO-burning regeneration zones for instance will contain lower residual carbon contents than will regenerated catalyst produced in non-CO-burning regeneration zones.

At this point the relationship between the term "coke" and the term "carbon" should be noted. The term "coke" refers to material comprising primarily carbon and hydrogen which is deposited on catalyst in the hydrocarbon reaction zone and which is removed, to varying degrees, by oxidation in a regeneration zone. The majority of coke is carbon but hydrogen can comprise from about 5 to about 15 wt. % of the coke. In the refining industry however, coke-containing catalyst samples are commonly and routinely analyzed for their carbon content and results are reported as weight percent carbon. While this weight percent carbon result approximates the coke content, it is not, strictly speaking, equal to the coke content on a particular catalyst sample.

In describing the method of our invention reference is made to regenerated catalyst having different residual carbon contents, more particularly referred to as the "first", "second", and "third" carbon content.

The first carbon content is that carbon content on regenerated catalyst produced by a regeneration zone operating at conditions so that essentially complete conversion of CO to $CO_2$ does not take place in the regeneration zone. This would be the carbon content of regenerated catalysts produced by the conventional (non-CO-burning) regeneration zones widely used today and, as is further described below, is the carbon content of regenerated catalysts produced during one stage or step in our method of initiating CO conversion in a CO-burning regeneration zone. The first carbon content will typically and preferably be within the range of from about 0.1 to about 0.6 wt. % carbon.

The second carbon content shall be a coke content of from about 0.1 to about 0.5 wt. % higher than the first carbon content. Typically and preferably the second carbon content will be within the range of from about 0.2 to about 0.8 wt. % carbon. The second carbon content is achieved by any of several possible methods as hereinafter discussed in detail.

The third carbon content shall be that carbon content on regenerated catalyst produced in a CO-burning regeneration zone operating at conditions such that CO is essentially completely converted to $CO_2$. Preferably, the third carbon content will be within the range of from about 0.01 to about 0.09 wt. % carbon.

The term "regeneration gas" as used in this specification shall mean, in a generic sense, any gas which is to contact catalyst or which has contacted catalyst within the regeneration zone. Specifically, the term "fresh regeneration" shall include free-oxygen-containing gases such as air or oxygen enriched or deficient air which pass into the dense bed of the regeneration zone to allow oxidation of coke on the spent catalyst therein. Free-oxygen shall refer to uncombined oxygen present in a regeneration gas.

The term "partially spent regeneration gas" shall refer to regeneration gas which has contacted catalyst within the dense-phase bed of a catalyst and which contains a reduced quantity of free-oxygen as compared to fresh regeneration gas. Partially spent regeneration gas will generally contain several volume percent each of nitrogen, free-oxygen, carbon monoxide, and carbon dioxide and water. More specifically, the partially spent regeneration gas will contain from about 7 to about 14 vol. % each of carbon monoxide and carbon dioxide.

The term "spent regeneration gas" shall mean regeneration gas which contains a reduced concentration of CO as compared to partially spent regeneration gas. preferably the spent regeneration gas will contain less than about 1000 ppm. of CO and more typically and preferably, less than about 500 ppm. CO. It is therefore apparent that the term "essentially complete combustion of CO" as used herein shall mean that the CO concentration in the spent regeneration zone has been reduced to less than about 1000 ppm. and more preferably less than about 500 ppm. Free-oxygen, carbon dioxide, nitrogen, and water will also be present in the spent regeneration gas. The free-oxygen concentration of the spent regeneration gas will generally be from about 0.1 to 10 vol. % of the spent regeneration gas and more preferably will be from about 0.2 to about 5 vol. %.

In accordance with the method encompassed by the present invention concept, essentially complete conversion of carbon monoxide to carbon dioxide is initiated and safely maintained within the confines of the regeneration zone. More specifically, the conversion takes place within the fluidized spent catalyst dense phase situated in a lower portion of the regeneration zone to produce spent regeneration gas which can be vented directly to the atomsphere.

In order to initiate and sustain essentially complete combustion of CO to $CO_2$ within the dense bed of a regeneration zone two requirements must be met: the dense bed temperature must be high enough to produce a sufficiently fast rate of reaction of CO oxidation and the quantity of fresh regeneration gas must be sufficient stoichiometrically for essentially complete CO oxidation.

The rate of reaction of CO oxidation must be sufficiently fast to permit essentially complete combustion of CO within a reasonable gas residence time in the dense bed of the regeneration zone. If the rate of reaction is too slow, it is possible that all of the CO combustion will not be completed in the time interval that partially spent regeneration gas is in the dense bed where there is sufficient catalyst density to absorb the heat of reaction. In this situation, CO combustion can then take place in the dilute phase region of the regeneration zone or in the flue gas line outside of the regeneration zone where it is not desirable. Dense-bed temperature above some minimum, generally about 1250° F., is therefore important to insure the proper rate of reaction.

The desired dense-bed temperature is achieved by the oxidation of sufficient fuel in the dense-bed of the regeneration zone. While some of the heat released by the oxidation of fuel within the dense-bed is lost to the surroundings that amount of heat lost is a small fraction of the total heat released and it is therefore generally recognized that FCC regeneration zone operation is essentially adiabatic. Since regeneration zone operation is adiabatic, the dense-bed temperature is a direct function of the amount of fuel oxidized in the dense bed. As the total amount of fuel oxidized in the dense-bed increases, the dense-bed temperature increases. Until intentional conversion of CO to $CO_2$ within the dense bed is initiated in a regeneration zone which is being operated to produce partially spent regeneration gas, the fuel is primarily coke on spent catalyst but will also include any adsorbed or interstitial hydrocarbons passing with the spent catalyst into the dense bed and any torch oil burned in the dense bed. Indeed, during initial FCC process startup the fuel is primarily torch oil until sufficient coke has been built up on the catalyst. When intentional conversion of CO to $CO_2$ is initiated, then CO contributes significantly to the total fuel burned in the dense bed.

The proper quantity of fresh regeneration gas is important because without sufficient oxygen present the oxidation of any fuel cannot occur. Specifically, as concerns the method of this invention the amount of fresh regeneration gas must be at least stoichiometrically sufficient for essentially complete CO oxidation. Furthermore, once CO conversion is initiated it is important that some excess of fresh regeneration be present beyond that stoichiometrically required to ensure the essentially complete conversion of the CO.

Thus by either controlling the amount of fuel passed into the regeneration zone or by controlling the amount of fresh regeneration gas which would allow a particular fuel or fuels to be burned or by a combination of both methods the dense-bed temperature can be controlled at any temperature from about 750° F. up to about 1400° F. The amount of fuel can be controlled in several ways. The amount of torch oil injected into the regeneration zone can, of course, be easily and directly increased or decreased. The amount of coke on spent catalyst can typically be controlled by varying the hydrocarbon reaction zone operating conditions, such as temperature, or by varying the composition of the feedstock to that reaction zone. Specifically, more coke on spent catalyst is produced as the hydrocarbon reaction zone conditions become more severe or as the feedstock becomes heavier, that is, as the Conradson carbon content of the feedstock increases. As hereinafter discussed in more detail the amount of carbon on regenerated catalyst can, independent of any hydrocarbon reaction zone conditions, also be increased by reducing the amount of fresh regeneration passed into the regeneration zone.

It is common practice to limit the operating temperatures of conventional regeneration zones to about 1250° F. by a combination of controlling the amount of coke on spent catalyst and controlling the amount of fresh regeneration gas passed into the regeneration zone to preclude the oxidation of CO. Coke control more specifically is achieved by limiting the hydrocarbon reaction zone temperature to some maximum or by limiting the amount of coke-producing slurry oil recycled to the hydrocarbon reaction zone to some maximum. These maximums are determined, for any particular feedstock, primarily by operating experience on the FCC process. A temperature near about 1250° F. is desired to produce the hottest possible regenerated catalyst yet the temperature is limited to a maximum of about 1250° F. both for the metallurgy limitations and because the rate of reaction of afterburning, should it occur during process upsets, is relatively slow. On some FCC processes, particularly those employing zeolite-containing catalysts and processing light feedstocks, it may be necessary to continuously burn torch oil in the regeneration zone to maintain a temperature of about 1250° F.

With the foregoing discussion in mind, we turn now to a discussion of the specific steps of the method of our invention.

In the method of our invention spent catalyst and fresh regeneration gas are first passed to a dense bed in the regeneration zone. More. specifically, fresh regeneration gas is initially passed into the dense bed at a first flow rate sufficient to oxidize coke to produce partially spent regeneration gas. By limiting the fresh regeneration to that sufficient to produce partially spent regeneration gas, essentially complete conversion of CO to $CO_2$ is so far precluded. Even more specifically, this first flow rate will preferably be in the range equivalent to about 8 to about 12 pounds of air per pound of coke entering the regeneration zone. Coke is then oxidized at first oxidizing conditions to produce regenerated catalyst having a first carbon content, hereinbefore defined, and partially spent regeneration gas.

First oxidizing conditions will include a dense bed temperature of from about 1150° F. to about 1250° F. not because of any metallurgical limitation but because the rate of reaction of afterburning, should if occur during unsteady startup conditions, is relatively slow. During startup torch oil will be burned in the regeneration zone until sufficient coke is deposited on the catalyst in the hydrocarbon reaction zone. Thereafter torch oil will gradually be reduced or eliminated as the amount of coke on spent catalyst increases and the dense bed temperature will be limited by the methods described above. OTher first oxidizing conditions will include an operating pressure of from about atmospheric pressure to about 50 psig. with the preferred range being from about 15 to about 40 psig. Additionally, superficial fresh regeneration gas velocities will be limited to the transport velocity, that is, the velocity past which the catalyst would be carried out of the dense bed upward into the dilute phase region. Superficial gas velocities will therefore be less than about 3 feet per second with 1.5 to 2.5 feet per second being the usual range. Any of several possible methods could be used to prevent the excessive flow rate of fresh regeneration gas. One method would be to employ mechanical limits or stops on the fresh regeneration regulating means. Another method would be to use an override system which would sense when such an excess of fresh regeneration gas was being passed into the regeneration zone and would limit the gas rate accordingly.

At this stage of operation, although CO oxidation is not allowed to take place, there is insufficient fuel being oxidized in the dense bed to achieve a dense bed temperature which would produce a sufficiently fast rate of reaction of CO oxidation, if it were allowed to occur, to ensure essentially complete conversion of CO to $CO_2$ within the dense bed and not in the dilute phase region above the dense bed. In preparation for initiating the essentially complete combustion of CO to $CO_2$ then it is necessary to increase the coke content on the regenerated catalyst, analyzed and reported as weight percent carbon, to provide this additional fuel. There is no alternative fuel to coke which alone would satisfy this purpose. The next step in the method of this invention is, therefore, increasing the coke content on the regenerated catalyst from the first carbon content to a second higher carbon content.

The coke content can be increased by any of several possible methods or combinations of methods. At constant regeneration zone operating conditions the hydrocarbon reaction zone temperature can be increased; the feedstock preheat temperature can be increased; or the amount of slurry oil recycled to the hydrocarbon reaction zone can be increased either and all of which will produce more coke on spent catalyst and, at constant regeneration zone operating conditions, more coke on regenerated catalyst. The coke on regenerated catalyst can also be conveniently increased at constant hydrocarbon reaction-zone conditions by reducing the fresh regeneration gas rate passing to the regeneration zone to an amount less than that required to produce regenerated catalyst having the first carbon content. A combination of such changes in both hydrocarbon reaction zone and regeneration zone operating conditions may also be employed to achieve regenerated catalyst having the second carbon content. The second carbon content will preferably be from about 0.1 to about 0.5 wt. % higher than the first carbon content and will typically and preferably be within the range of about 0.2 to about 0.8 wt. % carbon. As changes in operating conditions are being made to achieve the second carbon content the carbon content on regenerated catalyst will be determined by periodically withdrawing samples of regenerated catalyst from the regeneration zone and analyzing the samples, by methods well known to the refining industry, for wt. % carbon.

When in accordance with the method herein described, the coke content of the regenerated catalyst is being increased above the first carbon content the dense phase regenerator temperature will usually decrease, dependent upon changes which may simultaneously be made in the various operating parameters previously set forth, and a slight upset from steady-state, lined-out operation will occur. After the second carbon content is attained the second carbon content will be maintained by appropriate changes in operating conditions to attain a steady-state temperature of from about 1150° F. to about 1250° F. As a typical FCC process is instrumented and controlled, the process will tend to thermally stabilize itself and attain another level of steady-state line-out operation.

At this point insufficient fresh regeneration gas is being introduced into the regeneration zone to either oxidize the coke on regenerated catalyst to an amount less than the second carbon content or to essentially completely oxidize CO to $CO_2$. The additional amount of coke on regenerated catalyst, represented by the difference between the second coke content and the first coke content, is an additional amount of fuel which, when oxidized, will increase the regeneration zone temperature thereby permitting a faster rate of reaction of CO oxidation when the essentially complete oxidation of CO to $CO_2$ is allowed to occur.

The regeneration zone temperature is increased and essentially complete oxidation of CO to $CO_2$ is allowed to take place by passing fresh regeneration gas to the dense bed at a second flow rate at least stoichiometrically sufficient to produce regenerated catalyst having a third carbon content, less than the first carbon content, and sufficient to produce spent regeneration gas. More specifically and preferably this second flow rate will be in the range quivalent to about 12 to about 16 pounds of air per pound of coke entering the regeneration zone. When the fresh regeneration gas rate is increased the additional amount of coke on regenerated catalyst now rapidly oxidizes and the temperature of the dense bed increases to above about 1250° F. The higher dense-bed temperature and the presence of enough fresh regeneration gas to produce spent regeneration gas substantially spontaneously initiate essentially complete conversion of CO to $CO_2$ within the dense bed. Once initiated the exothermicity of CO oxidation maintains the dense bed temperature within the range of from about 1250° F. to about 1400° F. and the function of the additional coke on regenerated catalyst is no longer required.

Once initiated, steady-state line-out operation is achieved at second oxidizing conditions and at these conditions coke and CO are oxidized to produce regenerated catalyst having a third carbon content and spent regeneration gas. Second oxidizing conditions will include a temperature from about 1250° F. to about 1400° F. and a superficial fresh regeneration gas limited to the transport velocity. Operating pressure will be from about atmospheric pressure to about 50 psig. with the preferred range being from about 15 to about 40 psig. Because of the higher dense-bed temperatures the third carbon content of the regenerated catalyst will be lower than the first carbon content and will typically and preferably be from about 0.01 to about 0.09 wt. % carbon.

Thus by the method of our invention it is possible to safely initiate essentially complete combustion of CO to $CO_2$ in a dense bed in a manner to avoid potentially damaging afterburning in the dilute phase region of the regeneration zone. By essentially converting CO to $CO_2$ within the dense bed at least a portion of the heat of combustion is recovered within the regeneration zone. Furthermore, essentially no CO is vented to the atmosphere.

EXAMPLE

This example is presented for the purpose of illustrating one embodiment of the present invention. It is not intended that such illustration limit the invention beyond the scope and spirit of the appended claims.

The data presented in the following Table I represents a typical weekly average of various operating variables from a commercially-operating fluid catalytic cracking unit and indicates a portion of the product distribution and yields. During this period of time the regeneration zone of the unit was operated to preclude essentially complete conversion of CO to $CO_2$ within the regeneration zone. The average fresh regeneration gas (air in this example) rate was equivalent to 10.5 pounds of air per pound of coke entering the regeneration zone.

TABLE I

| FCC Process Weekly Average | |
|---|---|
| Combined Feed Temperature, ° F. | 725 |
| Reactor Temperature, ° F. | 947 |
| Regenerator Dense Phase Temperature, ° F. | 1197 |
| Flue Gas Temperature, ° F. | 1220 |
| Reactor/Regenerator Differential, ° F. | 250 |
| Regenerator/Flue Gas Differential, ° F. | 23 |
| Carbon Dioxide, mol. % | 11.0 |
| Carbon Monoxide, vol. % | 10.5 |
| Oxygen, mol. % | nil |
| Carbon Monoxide/Carbon Dioxide Ratio | 0.95 |
| Fresh Regeneration Gas Rate, lb air/lb coke | 10.5 |
| Gasoline, vol. % | 60.5 |
| Alkylation Feed, vol. % | 25.7 |
| Absorber Overhead, (SCFB) | 261 |
| Heavy Naphtha, vol. % | 6.0 |
| Light Cycle Oil. vol. % | 11.2 |
| Heavy Cycle Oil, vol. % | 7.9 |
| Weight Percent Coke | 5.4 |
| Conversion, vol. % | 80.9 |

During this period of operation, the carbon content of the regenerated catalyst varied from about 0.18% to about 0.21% by weight and averaged 0.20 wt.%.

To illustrate the method of the present invention, the air blower rate was slowly decreased, so as not to cause a severe upset in operation, until the first carbon content of the regenerated catalyst had increased from 0.20 wt.% to a second carbon content of about 0.51% by weight. No further decrease in air rate was made, and the unit attained a steady-state operation at a second carbon content of about 0.53% and a regenerator dense phase temperature of about 1182° F. When steady-state operation at the second carbon content was obtained, the air rate was increased to greater than initial steady-state conditions. More specifically the fresh regeneration gas rate was increased from a rate equivalent to 10.5 lb air/lb coke to a rate equivalent to 14.5 lb air/lb coke.

The regenerator dense phase temperature increased, and at a level of 1275° F. the carbon content of the regenerated catalyst was about 0.15% by weight, the $CO_2$ content of the flue gas was about 12.0% and the CO content was 5.0%, resulting in a $CO/CO_2$ ratio of 0.42. Approximately five hours later, the unit had attained a new steady-state operation which is illustrated by the data presented in Table II.

TABLE II

| Dense Phase Conversion of CO to $CO_2$ | |
|---|---|
| Combined Feed Temperature, ° F. | 512 |
| Reactor Temperature, ° F. | 922 |
| Regenerator Dense Phase Temperature, ° F. | 1380 |

TABLE II-continued

| Dense Phase Conversion of CO to $CO_2$ | |
|---|---|
| Dilute Phase Temperature, ° F. | 1392 |
| Reactor/Regenerator Differential, ° F. | 458 |
| Regenerator/Flue Gas Differential, ° F. | 12 |
| Carbon Dioxide, mol. % | 15.5 |
| Carbon Monoxide, mol. % | 0* |
| Oxygen, mol. % | 1.5 |
| Carbon Monoxide/Carbon Dioxide Ratio | 0 |
| Fresh Regeneration Gas Rate, lb air/lb coke | 14.6 |
| Gasoline, vol. % | 60.9 |
| Alkylation Feed, vol. % | 27.2 |
| Absorber Overhead, (SCFB) | 226 |
| Heavy Naphtha, vol. % | 6.1 |
| Light Cycle Oil, vol. % | 11.2 |
| Heavy Cycle Oil, vol. % | 7.5 |
| Weight Percent Coke | 4.5 |
| Conversion, vol. % | 81.5 |
| Carbon on Regenerated Catalyst, Wt. % | 0.02 |

*Analysis by more accurate method was 350 ppm.

A comparison of the data presented in Tables I and II reveals several of the outstanding advantages stemming from the use of the present invention. Immediately observed is the fact that the carbon monoxide content of the flue gas is less than 500 ppm. The combined feed temperature has been decreased 213° to 512° F.; in the actual operation, the fresh feed preheater was taken out of service. Coke yield, based on fresh feed decreased from 5.4% by weight to 4.5% by weight; conversion of fresh feed increased from 80.9 to 81.5%; gasoline yield increased from 60.5 vol.% to 60.9 vol.% and alkylate feed increased from 25.7 to 27.2 vol.%.

The foregoing illustrates the method of effecting the present invention, and indicates the benefits to be afforded through the utilization thereof.

We claim as our invention:

1. A method for initiating essentially complete oxidation of CO to $CO_2$ in a dense-phase catalyst bed in a regeneration zone, said zone containing a dilute phase catalyst zone superimposed over said dense-phase catalyst bed manitained within a spent catalyst regeneration zone which is integrated with a hydrocarbon reaction zone, which method comprises the steps of:

(a) passing to the dense bed spent catalyst and fresh regeneration gas at a first flow rate sufficient to oxidize coke to produce regenerated catalyst having a first carbon content of from about 0.1 to about 0.6 wt. % and partially spent regeneration gas, the quantity of fresh regeneration gas introduced being equivalent to about 8 to about 12 pounds of air per pound of coke;

(b) oxidizing coke at first oxidizing conditions including a first temperature of from about 1150° F. to about 1250° F. to produce regenerated catalyst having said first carbon content and partially spent regeneration gas containing from about 7 to about 14 vol. % each of CO and $CO_2$;

(c) increasing the coke content of said regenerated catalyst from said firs carbon content to a second coke content and within the range of about 0.2 to about 0.8 wt. % carbon;

(d) maintaining said second carbon content to attain a steady-state dense-bed temperature;

(e) passing additional fresh regeneration gas to the dense bed at a second flow rate providing a quantity of said additional fresh regeneration gas at least stoichiometrically sufficient to produce regenerated catalyst having a third carbon content of from about 0.01 to about 0.09 wt. % carbon and sufficient to produce spent regeneration gas, said quantity of additional regeneration gas being equivalent to about 12 to about 16 pounds of air per pound of coke; and (f) oxidizing coke at second oxidizing conditions including a second temperature within the range of about 1250° F. to about 1400° F. to produce regenerated catalyst having said third carbon content and spent regeneration gas containing less than 1000 ppm. CO.

2. The method of claim 1 further characterized in that the coke content is increased from said first carbon content to said second carbon content by reducing the fresh regeneration gas rate until said carbon content is achieved.

3. The method of claim 1 in which a feedstock is preheated and introduced into said hydrocarbon reaction zone further characterized in that the coke content in said dense-phase catalyst bed is increased from said first carbon content to said second carbon content by increasing the hydrocarbon reaction zone feedstock preheat temperature until the second carbon content is achieved.

4. The method of claim 1 further characterized in that the coke content is increased from said first carbon content to said second carbon content by increasing the hydrocarbon reaction zone temperature until the second carbon content is achieved.

5. The method of claim 1 in which slurry oil is separated from the product of said hydrocarbon reaction zone and recycled to said hydrocarbon reaction zone further characterized in that the coke content is increased from said first carbon content to said second carbon content by increasing the amount of slurry oil recycle returned to the hydrocarbon reaction zone until the second carbon content is achieved.

6. The method of claim 1 further characterized in that said spent regeneration gas contains less than about 500 ppm. CO.

7. The method of claim 1 further characterized in that the free-oxygen concentration of the spent regeneration gas is from about 0.2 to about 5 vol.%.

* * * * *